Nov. 25, 1930.  J. DAVIDSON  1,782,714
APPARATUS FOR TREATING OLEAGINOUS MATERIAL
Filed April 15, 1929  3 Sheets-Sheet 1

Inventor
Joseph Davidson,
By Cushman, Bryant Darby
Attorneys.

Nov. 25, 1930. J. DAVIDSON 1,782,714
APPARATUS FOR TREATING OLEAGINOUS MATERIAL
Filed April 15, 1929 3 Sheets-Sheet 3

Inventor
Joseph Davidson
By Cruchenen, Bryant & Darby
Attorneys

Patented Nov. 25, 1930

1,782,714

UNITED STATES PATENT OFFICE

JOSEPH DAVIDSON, OF ATLANTA, GEORGIA, ASSIGNOR TO DAVIDSON-KENNEDY COMPANY, OF ATLANTA, GEORGIA, A CORPORATION OF GEORGIA

APPARATUS FOR TREATING OLEAGINOUS MATERIAL

Original application filed April 10, 1928, Serial No. 268,917. Divided and this application filed April 15, 1929. Serial No. 355,304.

The present invention relates to an improved apparatus for cooking oleaginous material and other oil bearing meats such as cotton seeds and nuts preparatory to the extraction of the crude oil therefrom and is a division, under official requirement, of my co-pending application, Serial No. 268,917, filed April 10, 1928.

A primary object of the invention is to provide a simple, efficient and economical apparatus for treating oil bearing meats.

Other objects and advantages will become apparent from the following description when taken in conjunction with the accompanying claims.

Referring to the drawings in which is shown a preferred embodiment of the invention, Figure 1 is a plan view of the apparatus.

Figure 2:
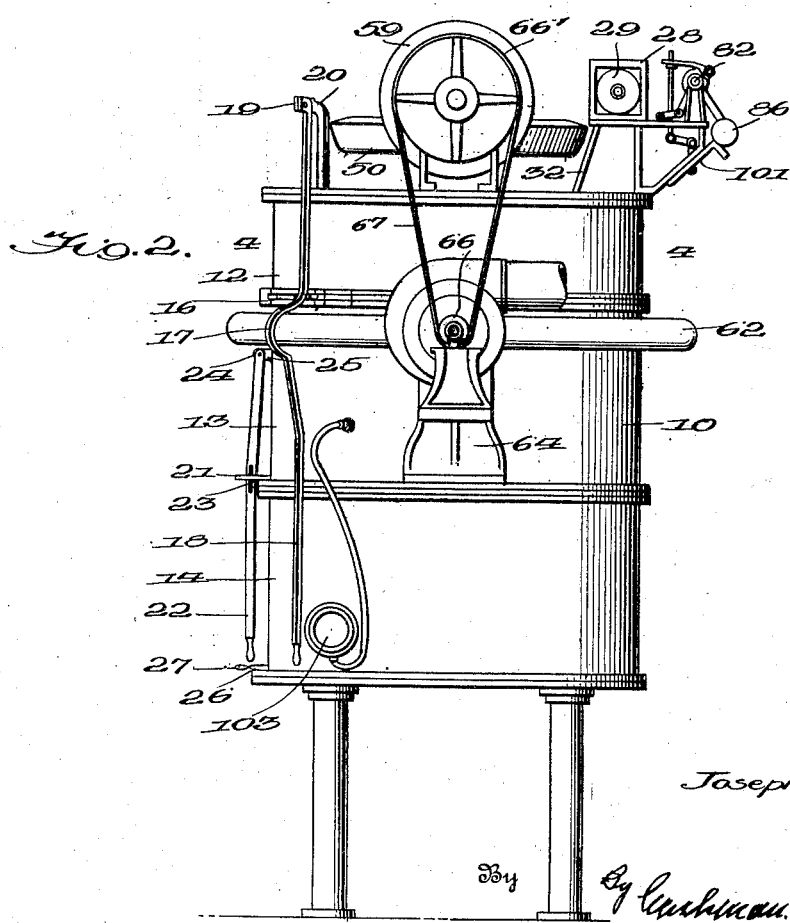
Figure 2 is a side elevation of Figure 1.

Referring to the drawings in which is shown a preferred form of apparatus for carrying out my method of treating the oleaginous material preparatory to the extraction of the crude oil therefrom, 10 indicates a kettle or receptacle which is supported by the legs 11 and is preferably divided into a measuring compartment 12, a cooking compartment 13 and a receiving compartment 14. Each of these compartments has in the bottom thereof a discharging opening 15 (Fig. 4) the supply through which is controlled by any suitable mechanism. As shown, the opening 15 in the bottom of the measuring compartment or chamber 12 has associated therewith a slidable valve 16, which is suitably connected as at 17 to a manually operating lever 18 (Fig. 2) which lever at its upper end is pivoted as at 19 to a bracket 20 secured to the kettle. The opening in the cooking kettle is likewise provided with a gate valve 21 which is connected to a manually operating lever 22 as at 23. The lever 22 is pivoted at its upper end as at 24 to a lug 25. The opening in the bottom of the receiving kettle may also have a slidable valve 26, the handle 27 of which extends exteriorly thereof so as to be in a position to be conveniently manipulated.

Figure 5:
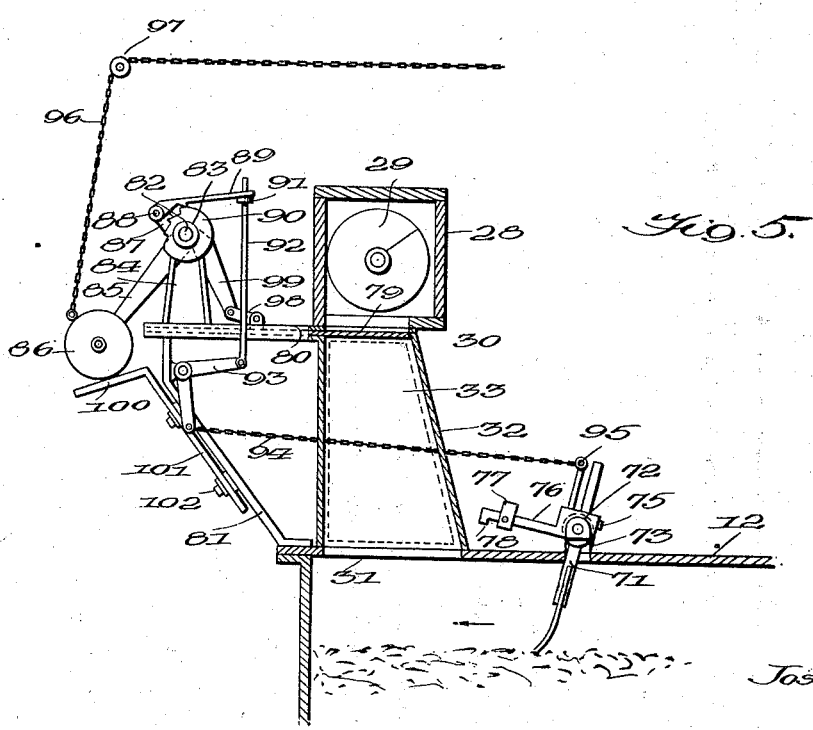
Figure 5 is a sectional detail view of a portion of the kettle showing the automatic control mechanism for regulating the supply.

The measuring compartment 12 has preferably mounted on the top thereof a delivery trough or container 28 in which is mounted a spiral conveyer 29, that receives the material from any suitable point of supply and conducts it to the kettle to be treated. The trough 28 is provided with an opening 30 that aligns with a complementary formed opening 31 in the top of the measuring compartment 12 (Fig. 5). A housing 32 encloses the passage 33 formed between the trough 28 and the kettle 10 and acts as a chute for delivering the material to be treated to the interior of the measuring compartment 12.

Figure 3:
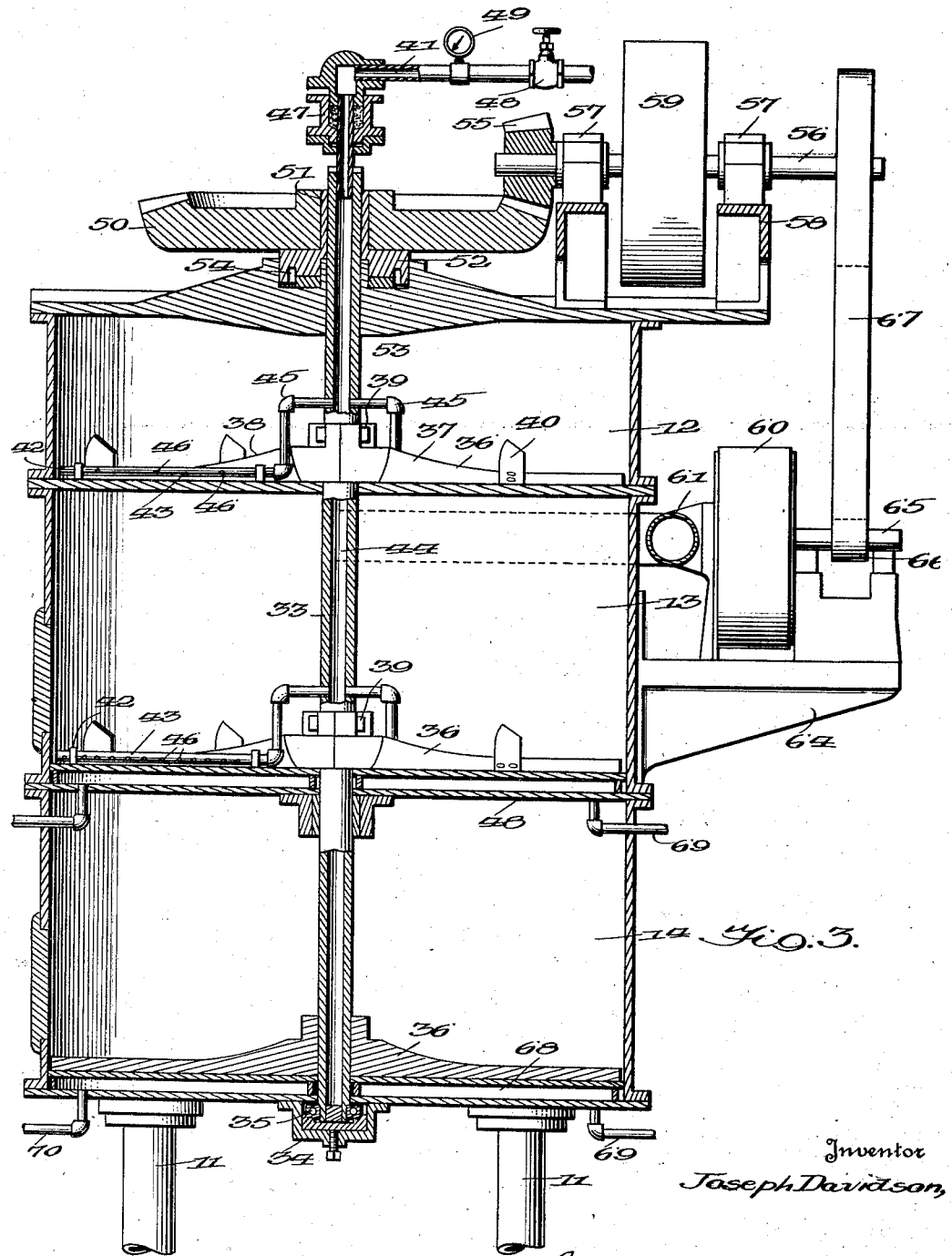
Figure 3 is a sectional view taken substantially along the line 3—3 of Figure 1.

Extending vertically through the kettle 10 is a tubular drive shaft 33, the lower end of which is journalled in the bearing 34 connected to the underside of the receiving compartment 14 and is preferably provided with the ball bearings 35 for reducing the friction on the shaft 33. Mounted in each of the compartments 12, 13 and 14, adjacent the bottom thereof, is a revoluble sweep 36, which preferably is composed of the sections 37 and 38 that are clamped to the drive shaft 33 by the bolts 39 (Fig. 3) so as to be revoluble therewith. Each of the sweeps 36 may also be provided with the upwardly projecting stirrer arms or blades 40 for insuring the proper agitation of the material prior to its being discharged from one compartment to the other.

The tubular shaft 33 also acts as a conduit for conducting superheated or saturated steam from a supply pipe 41 to the interior of the measuring and cooking compartments 12 and 13 respectively. In order that this may be effected, the sweeps 36 have secured thereto by the lugs 42, the radially disposed perforated pipes 43 which communicate with the steam supply passage 44 through the branches 45. The pipes 43 in the measuring kettle are provided with a smaller number of perforations 46 than are the pipes in the cooking compartment, since it has been found that a small amount of superheated steam should be admitted into the measuring compartment so as to bring up the moisture and temperature of the material before it is discharged into the cooking compartment so that it will be preliminarily heated and immediately go to cooking when delivered to the compartment 13. The shaft 33 is rotatably connected to the supply pipe 41 by a revoluble coupling 47. The pipe 41 communicates with any suitable source of steam supply (not shown) and is provided with a valve 48 for controlling the supply of steam to the kettle and may also have mounted thereon a steam gage 49, for indicating the increase or decrease of the pressure of the steam delivered to the kettle.

The drive shaft 33 is actuated by a gear wheel 50 that is mounted in a bearing 51 splined to the shaft 33. The bearing 51 may also have an enlarged annular portion 52, which rests in a packing 53 mounted in a recess 54 formed in the top of the kettle 10. The gear wheel 50 meshes with a complementary pinion 55 keyed or otherwise secured to a shaft 56, which shaft is supported by the bearings 57 carried by the brackets 58, which brackets are suitably mounted on the kettle. The shaft 56 may be driven in any suitable manner such as by a pulley wheel 59 that is arranged to be connected to a motor or the like (not shown).

Figure 4:
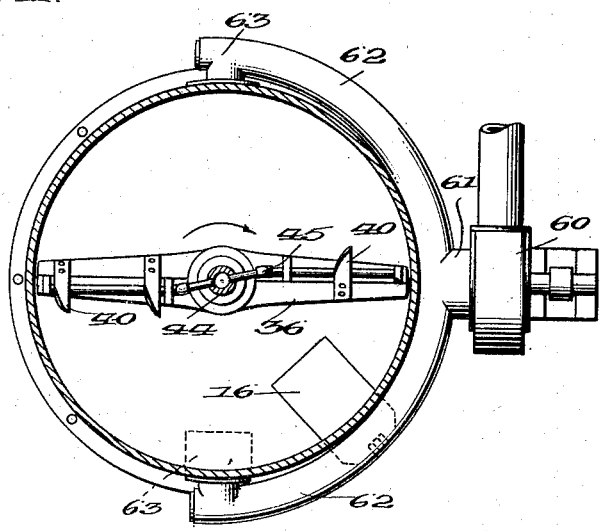
Figure 4 is a sectional view taken substantially along the line 4—4 of Figure 2.

The excess steam and moisture in the cooking compartment 13 is withdrawn therefrom preferably by a suction fan 60 which communicates with the interior of the cooking compartment through the pipe 61 that has the lateral branches 62 that extend into the interior of the compartment 13 as at 63 (Fig. 4). The fan 60 is supported by a bracket 64 suitably secured to the kettle and is provided with a shaft 65 on which is secured a pulley wheel 66 that is connected by an endless belt 67 to a pulley 66' on the shaft 56, so that the fan may be simultaneously operated with the actuation of the drive shaft 33 and its associated parts.

The bottom of the compartments 13 and 14 are preferably formed with the heating chambers 68 in which a small amount of steam is delivered by the pipe 69 and escapes therefrom through the pipe 70, so as to prevent the temperature of the material from lowering as it falls from the cooking chamber 13 to the receiving chamber 14.

Figure 1:
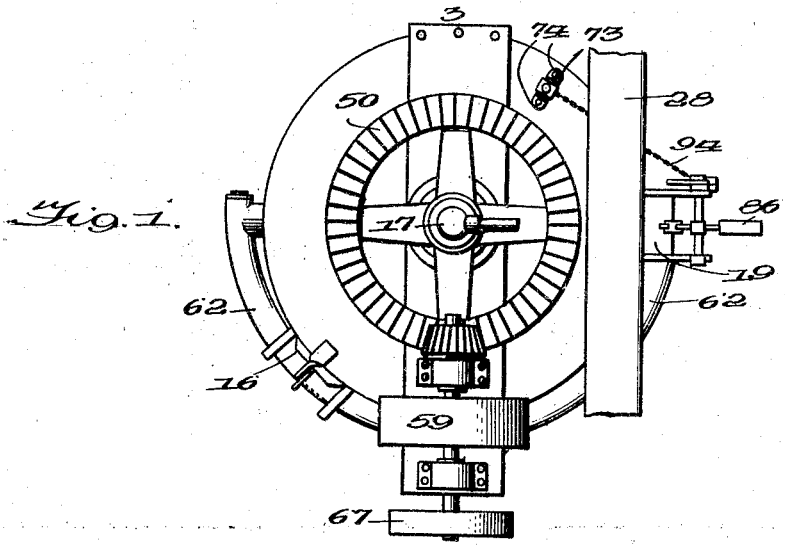

The amount of material delivered from the conveyor 29 to the measuring compartment 12 may be automatically regulated by means of a swinging paddle 71, that extends vertically through an opening in a boss 72 that is pivotally mounted between the lugs 73, which lugs are suitably secured to the top of the kettle by the bolts 74 (Fig. 1). An externally disposed set screw 75 is arranged to permit the paddle 71 to be maintained in any predetermined vertical position as may be desired. The boss 72 has a laterally extending arm 76 (Fig. 5) which extends loosely through a lug 77 and also has a depending finger 78, for limiting the movement of the paddle. A slidable gate 79 is arranged to extend into the opening 30 in the bottom of the trough 28, so as to control the supply of material delivered from the conveyor 29 to the interior of the measuring compartment 12. This gate is slidably mounted in a housing 80 that is supported by a bracket 81, secured to the kettle. A rotatable shaft 82 is journalled in bearings 83 formed in the supporting arms 84, which arms are suitably attached to the housing 80. Splined or otherwise secured to the shaft 82 is a bell crank having connected to the free end of one of its arms 85 a ponderous member 86 and to its other arm 87 is pivotally secured as at 88, a pawl 89 that is arranged to engage a notch disc or ratchet 90 keyed or otherwise secured to the shaft 82. The free end of the pawl 89 rests against a support such as a nut or the like 91 secured to a rod 92, which rod is pivoted at its lower end to one arm of a bell crank 93, while the other arm of the bell crank is connected by the chain 94 to an arm 95 on the boss 72. The ponderous member 86 is connected to one end of a chain 96, which passes over a sheave pulley 97, while the opposite end of the chain is arranged to extend to a point convenient to where the operator stands. The gate 79 is operatively connected by a link 98 to an arm 99, keyed or otherwise secured to the shaft 82, so that upon the actuation of said shaft reciprocating movement will be imparted to the gate 79, in order to open or close the opening 30.

The gate 79 is normally maintained in its open position due to the pawl 89 engaging the teeth of the disc 90, so as to prevent rotation of the shaft 82 or the actuation of the valve 79. When the parts are in this position, the weight 86 is moved upwardly out of engagement with the seat 100 formed by a portion of the arm 101, that is secured by the bolts 102 to the bracket 81. As the meats in the measuring compartment 12 have a rotary movement in the same direction as the sweeps 36, this movement of the meats is sufficient when they come in contact with the swinging paddle 71 to move it forward enough to pull the chain 94, which in turn actuates the bell crank 93 and rod 92 to raise the free end of the pawl 89, thus releasing the pawl from engagement with the disc 90 and allowing the ponderous member 86 to drop and the shaft 82 to rotate, which in turn causes the arm 99 to move the gate 79 to its closed position (Fig. 5). The operator then opens the valve 16 in the bottom of the measuring kettle which allows the material therein to be conducted to the cooking kettle 13. When the measuring kettle has been emptied, the operator then pulls the chain 96 which raises the weight 86 and arm 85, thus rotating the shaft 82 and causing the gate 79 to be moved to its open position and maintained therein by the pawl 89 falling into locked engagement with the toothed portion of the disc 90.

The operation of the device is as follows:

Assuming that superheated steam in excess of 400° F. is being conducted by the pipe 41 to the interior of the measuring compartment 12 and the cooking compartment 13 through the perforations in the pipes 42, and the drive shaft 33 and its associated parts are being revolved by the pulley wheel 59, the crushed seed or material is conducted by the conveyor 29 through the trough 28 to the opening 30. Moreover, assuming that the gate 79 has been previously moved to its open position, the material will be delivered to the measuring compartment 12 and when this compartment fills up to a predetermined depth, the material therein which is being rotated by the sweeps 36 will be brought into contact with the swinging paddle 71, causing the same to move in the direction of the arrow (Fig. 5) which in turn moves the chain 94 in an opposite direction, thus raising the rod 92 which causes the pawl 89 to be moved out of locking engagement with the disc 91, which allows the weight 86 to fall by gravity to the position as shown in Figure 5 and rotates the shaft 82 that actuates the arm 99, so as to cause the same to move the gate 79 to its closed position (Fig. 5). The operator then opens the valve 16 in the bottom of the measuring kettle 12 by the actuation of the lever 18 which empties the material into the cooking compartment 13. After this has been done the operator then pulls the chain 96 so as to raise the weight 86 and the arm 85 upwardly, which rotates the shaft 82, so as to move the gate 79 to its open position. During the meantime, the pawl 89 falls into engagement with the teeth on the disc 90, thus temporarily preventing the movement of the shaft 82.

A thermometer 103 (Fig. 2) is positioned outside of the kettle and has its bulb extending into the cooking compartment 13, so as to register the actual degrees of heat of the material being cooked. When this thermometer registers a temperature of approximately 235° F., it notifies the operator that the material is sufficiently cooked and he then opens the valve in the bottom of the cooking compartment by actuating the lever 22, so as to cause the material to be delivered to the receiving compartment 14 from where it may be delivered to a cake forming machine (not shown) through the opening of the valve 26 that is actuated by a handle 27. Of course, it will be understood that the treating of the material is continuous, that is to say, as soon as the material delivered to the measuring compartment reaches a predetermined depth, the paddle 71 will cut off the supply thereto and the operator will empty the contents of this compartment into the cooking compartment and then open the valve 79, so as to deliver a fresh supply of material to the measuring compartment.

The excess steam and moisture in the cooking compartment 13 is withdrawn therefrom by the suction fan 60, so that while the temperature of the steam passing through this compartment is in excess of 400° F., the material being cooked only reaches a temperature of approximately 235° F. With this method of cooking, the material is usually treated for a period of about twenty minutes which is the pressing schedule in most oil mills. Experiments have shown that the temperature in the material of 235° F. is reached in less than eighteen minutes, but the material need not be removed from the cooking compartment until several minutes thereafter. Keeping the material in the cooking compartment after it reaches 235° F. does not tend to burn or impart any undesirable flavor thereto, since the temperature does not rise above this point, it being held there by the ratio of evaporation to the quantity of steam passing through the material and the fact that the suction fan 60 is continuously withdrawing the excess steam and moisture. Of course, if it were desirable to raise the temperature of the cooking material beyond 235° F., this could be readily effected by providing a valve in the pipe 61, so as to close or partly close the outlet which would allow the temperature in the cooking compartment 13 to be raised to any temperature desired.

By reason of the treating or cooking of oleaginous material preparatory to the extraction of the crude oil therefrom by passing steam having a temperature in excess of 400° F. directly through the material from the bottom upward and drawing off the excess steam and moisture, it has been found that not only does this process produce a better quality of oil, but it also reduces the cooking time and effects a considerable economy in the cost of operation.

I prefer to cook the material by treating it with superheated steam since experiments have proven that cotton seed meats are more thoroughly cooked when subjected to superheated steam than when treated by saturated steam. The best quality of oil is obtained when the temperature of the steam moving directly through the oleaginous material ranges from between 400° F. to 700° F.

It is to be understood that the apparatus herewith shown and described is merely illustrative of a preferred embodiment and that such changes as fall within the purview of one skilled in the art may be made without departing from the spirit of the invention and the scope of the appended claims.

What I claim is:

1. A cooking apparatus for oleaginous material comprising a receptacle separated into a measuring compartment, a cooking compartment, and a receiving compartment, said compartments having communicating openings, manually operable means for controlling the supply through said openings, a supply trough positioned above said measuring compartment and having a passage communicating therewith, a slidable gate valve for controlling the supply through said passage, means normally maintaining said gate valve in its open position, a paddle extending through the top of said measuring kettle and operatively connected to said gate valve to automatically close the same when the material reaches a predetermined depth in the measuring kettle, a tubular shaft extending axially through said kettle, stirrer blades clamped to said shaft adjacent the bottom of the measuring and cooking compartments, means delivering steam through said tubular shaft to the bottom of said measuring and cooking compartments, means associated with the cooking compartment for drawing off the excess steam and moisture therefrom, and means for revolving said tubular shaft.

2. A cooking apparatus for oleaginous material comprising a receptacle separated into a measuring compartment, a cooking compartment, a receiving compartment, said compartments having communicating openings, manually operable means for controlling the supply through said openings, a supply trough positioned above said measuring compartment and having a passage communicating therewith, a slidable gate valve for controlling the supply through said passage, means normally maintaining said gate valve in its open position, a vertically adjustable paddle extending through the top of said measuring kettle and operatively connected to said gate valve to automatically close the same when the material reaches a predetermined depth in the measuring kettle, a tubular shaft extending axially through said kettle, stirrer blades clamped to said shaft adjacent the bottom of the measuring and cooking compartments, means delivering steam through said tubular shaft to the bottom of said measuring and cooking compartments, means associated with the cooking compartment for drawing off the excess steam and moisture therefrom, and means for revolving said tubular shaft.

3. A cooking apparatus for oleaginous material comprising a kettle having a measuring compartment and a cooking compartment, means for controlling the supply from the measuring compartment to the cooking compartment, a supply trough positioned above said measuring compartment and having a passage communicating therewith, a slidable valve for controlling the supply through said passage, an actuating shaft, means operatively connecting said valve to said shaft, locking means removably engaging said shaft for normally maintaining the valve in its open position, means extending through the top of said measuring compartment a predetermined distance and operatively connected to said locking means for disengaging the same from said shaft when the material in the measuring kettle reaches a predetermined height, and means connected to said shaft whereby upon the release of the locking means therewith for causing the slide valve to close.

4. A cooking apparatus for oleaginous material comprising a kettle having a measuring compartment and a cooking compartment, means for controlling the supply from the measuring compartment to the cooking compartment, a supply trough positioned above said measuring compartment and having a passage communicating therewith, a slidable valve for controlling the supply through said passage, an actuating shaft, means operatively connecting said valve to said shaft, a locking pawl associated with said shaft for normally maintaining the valve in its open position, a paddle movably mounted on said apparatus and extending through the top of the measuring compartment a predetermined distance, and means operatively connecting said paddle with said pawl whereby when the material in the measuring kettle reaches a predetermined height, the pawl will be released from engagement with the shaft and means connected to said shaft whereby upon the release of the pawl therewith for causing the valve to be moved to its closed position.

5. A cooking apparatus for oleaginous material comprising a kettle having a measuring compartment and a cooking compartment, means for controlling the supply from the measuring compartment to the cooking compartment, a supply trough positioned above said measuring compartment and having a passage communicating therewith, a slidable valve for controlling the supply through said passage, an actuating shaft, means operatively connecting said valve to said shaft, a locking pawl associated with said shaft for normally maintaining the valve in its open position, a vertically adjustable paddle movably mounted on said apparatus and extending through the top of the measuring compartment a predetermined distance, and means operatively connecting said paddle with said pawl whereby when the material in the measuring kettle reaches a predetermined height, the pawl will be released from engagement with the shaft and means connected to said shaft whereby upon the release of the pawl therewith for causing the valve to be moved to its closed position.

6. A cooking apparatus for oleaginous material comprising a kettle having a measuring compartment and a cooking compartment, means for controlling the supply from the measuring compartment to the cooking compartment, a supply trough positioned above said measuring compartment and having a passage communicating therewith, a slidable valve for controlling the supply through said passage, an actuating shaft mounted upon said kettle, means operatively connecting said slidable valve to said shaft, a disc wheel splined to said shaft and having a peripheral toothed surface, a bell crank keyed to said shaft, a pawl pivoted to one arm of said bell crank and a ponderous member secured to the other arm thereof, a vertically disposed rod loosely supporting the free end of said pawl, said pawl adapted normally to engage said disc to prevent rotation of said shaft and maintain the slidable valve in its opened position, a swinging paddle extending into the top of said measuring kettle, means connecting said paddle to said rod whereby upon the material in the measuring kettle reaching a predetermined depth will cause the paddle to raise the rod upwardly, thus releasing the engagement of the pawl with said disc and causing the closing of the slidable valve, and means for returning the slidable valve to its open position.

7. A cooking apparatus for oleaginous material comprising a kettle having a measuring compartment and a cooking compartment, means for controlling the supply from the measuring compartment to the cooking compartment, a supply trough positioned above said measuring compartment and having a passage communicating therewith, a slidable valve for controlling the supply through said passage, an actuating shaft mounted on said kettle, means operatively connecting said slidable valve to said shaft, a disc wheel having a toothed peripheral surface splined to said shaft, a bell crank keyed to said shaft, a pawl pivoted to one arm of said bell crank and a weighted member secured to the other arm thereof, a rod loosely supporting the free end of said pawl, said pawl adapted normally to engage said disc to prevent rotation of said shaft and maintain said valve in its open position, means connected to said weight member for moving the same and turning said shaft so as to actuate said slidable valve, a swinging paddle extending vertically into the top of said measuring kettle, means for maintaining said paddle in a predetermined vertical position, means operatively connecting said paddle to said rod whereby upon the material in the measuring kettle reaching a predetermined depth will cause the raising of said rod and the disengagement of the pawl with said disc and the closing of the slidable valve, and manual means for returning the slidable valve to its open position.

8. A cooking apparatus for oleaginous material comprising a kettle having a measuring compartment, a cooking compartment, and a receiving compartment, means communicating adjacent compartments with each other, means controlling the supply from one compartment to the other, a supply trough communicating with said measuring compartment, a valve for controlling the supply to said measuring compartment, means normally maintaining said valve in its open position, a paddle extending through the top of said measuring compartment a predetermined distance and operatively associated with said valve, said paddle adapted when engaged by the material in the measuring compartment to actuate the valve and cut off the supply to the measuring compartment, a tubular shaft extending axially through said kettle, externally disposed means engaging said paddle for maintaining the same in a predetermined vertical position, stirrer blades clamped to said shaft adjacent the bottom of the measuring and cooking compartments, means delivering steam through said tubular shaft to the bottom of said measuring and cooking compartments, means associated with the cooking compartment for drawing off the excess steam and moisture therefrom, and means for revolving said tubular shaft.

9. A cooking apparatus for oleaginous material comprising a kettle having a measuring compartment and a cooking compartment, means for controlling the supply from the measuring compartment to the cooking compartment, a supply trough positioned above said measuring compartment and having a passage communicating therewith, a slidable valve for controlling the supply through said passage, an actuating shaft, means operatively connecting said valve to said shaft, a locking pawl associated with said shaft for normally maintaining the valve in its open position, a paddle extending through the top of said measuring compartment, a pivotal support for said paddle, means for maintaining the paddle in a predetermined adjusted position, means operatively connecting said paddle to said pawl whereby when the material in the measuring kettle reaches a predetermined height, the pawl will be released from locking engagement with said shaft, means connected to said shaft whereby upon the release of the pawl therewith for causing the valve moved to its closed position, and manually operable means for returning the valve to its open position.

In testimony whereof I have hereunto set my hand.

JOSEPH DAVIDSON.